Patented Dec. 18, 1928.

1,695,641

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

STABILIZED CHLORINATED RUBBER.

No Drawing. Application filed March 22, 1924. Serial No. 701,021.

This application is in part a continuation of co-pending application, Serial No. 480,565, filed June 27, 1921 and Serial No. 496,594, filed Aug. 29, 1921. The invention relates to chlorinated rubber products, and particularly to such products which are of a permanently non-acid character.

Chlorinated rubber is made by causing chlorine to react with rubber, particularly raw or crude rubber, according to any of the methods set forth in the applicant's co-pending applications, or other methods, whereby products containing from 40% to upwards of 67% of combined chlorine result. These materials are hard, somewhat tough solids, which are readily soluble in benzol, and its homologs, solvent naphtha, carbon bisulfide, carbon tetrachloride, and other solvents.

They exhibit, however, a tendency to decompose, freeing hydrochloric acid, this tendency being slightly greater in the more highly chlorinated varieties. At ordinary temperatures the action is almost negligible or at most very slow. At somewhat elevated temperatures, the decomposition becomes a little more marked, until at about 170°–180° C. it becomes rapid.

For many of the purposes to which chlorinated rubber may be put, the presence of acid is undesirable. For example, in electrical insulation it lowers the resistance and thus impairs the efficiency. Metal objects coated with acid chlorinated rubber or chlorinated rubber which may become acid, may suffer from corrosion. Paper or fabric impregnated with compositions containing chlorinated rubber may become deteriorated and weakened, and cans used to contain the solution or solid may be corroded if acid be present.

Certain substances, generally of a basic nature, and which are soluble in the same solvents as chlorinated rubber, may easily be incorporated. These materials unite with the hydrochloric acid, forming neutral compounds. Chlorinated rubber, which is entirely free from acid appears to show less tendency to decompose than acid specimens. Hence such antacid substances are especially efficacious in stabilizing chlorinated rubber, and maintaining it permanently non-acid. Examples of suitable antacids are aniline, toluidine, xylidine, and the like, which are particularly useful in stabilizing solutions; also such materials as diphenylamine, phenylene diamine, urea, etc., which are of advantage in keeping solutions non-acid, and which being solids, remain upon evaporation of the solvents, thus stabilizing also the solid chlorinated rubber.

In some cases, where complete homogeneity is not necessary, the use of antacids insoluble in solvents for chlorinated rubber is not precluded. Such materials include zinc oxide, barium oxide, magnesia, and similar substances.

In the case of the soluble antacids the amount employed is preferably considerably less than that of the chlorinated rubber. Only a slight excess over the amount necessary to combine with any acid originally present need be supplied.

In the foregoing and in the appended claims, chlorinated rubber is referred to but it is to be understood that the use along with chlorine of bromine or other halogens in making a chlorinated product also having other halogens in combination is not precluded since included within the purview of this invention are chlorinated rubber products or chlorinated rubber derivatives which may contain other elements than simply chlorine, carbon and hydrogen all to such extent as such products function in a manner similar or analogous to true chlorinated rubber. Likewise in place of natural rubber artificial rubber may be employed in some cases as a basis for halogenation; or gutta percha, balata, etc., may be utilized.

What I claim is:—

1. A composition containing a chlorinated rubber of not substantially below 67% of chlorine, and an antacid material, both being soluble in a common solvent.

2. A composition containing a chlorinated rubber of not substantially below 67% of chlorine, and an organic antacid material, both being soluble in a common solvent.

3. A composition containing a chlorinated rubber of not substantially below 67% of chlorine, and an organic amino antacid material, both being soluble in a common solvent.

CARLETON ELLIS.